US012280718B2

United States Patent
Zhang et al.

(10) Patent No.: US 12,280,718 B2
(45) Date of Patent: Apr. 22, 2025

(54) ACTUATOR SPHERICAL SHELL STRUCTURE, REARVIEW MIRROR AND VEHICLE (71) Applicant: Ningbo SMR Huaxiang Automotive Mirrors Ltd., Zhejiang Province (CN)

(72) Inventors: Liang Zhang, Zhejiang Province (CN); Zhanglong Peng, Zhejiang Province (CN)

(73) Assignee: Ningbo SMR Huaxiang Automotive Mirrors Ltd., Zhejiang Province (CN)

( * ) Notice: Subject to any disclaimer, the term of this patent is extended or adjusted under 35 U.S.C. 154(b) by 0 days.

(21) Appl. No.: 18/754,360

(22) Filed: Jun. 26, 2024

(65) Prior Publication Data
US 2025/0018862 A1 Jan. 16, 2025

(30) Foreign Application Priority Data
Jul. 10, 2023 (CN) .......................... 202310840673.7

(51) Int. Cl.
*B60R 1/072* (2006.01)
*B60R 1/12* (2006.01)
(52) U.S. Cl.
CPC ................ *B60R 1/072* (2013.01); *B60R 1/12* (2013.01); *B60R 2001/1253* (2013.01)
(58) Field of Classification Search
CPC ......... B60R 1/1207; B60R 1/074; B60R 1/06; B60R 1/12; B60R 1/072; B60R 2001/1253
See application file for complete search history.

(56) References Cited

U.S. PATENT DOCUMENTS 10,017,119 B2 7/2018 Chong
2023/0339398 A1* 10/2023 Bravo Corbacho .... B60R 1/072

FOREIGN PATENT DOCUMENTS

CN 202243195 5/2012
WO 2021/224492 11/2021

OTHER PUBLICATIONS

European Patent Office, Appl. 23188754.8, Extended European Search Report, Feb. 9, 2024.

* cited by examiner

Primary Examiner — Anne M Hines
(74) Attorney, Agent, or Firm — Jones Day (57) ABSTRACT The present disclosure discloses an actuator spherical shell structure, rearview mirror and vehicle; the actuator spherical shell structure comprising an actuator spherical shell surface located inside the housing and a housing spherical shell surface located outside the actuator and rotating in coordination with the actuator spherical shell surface. The actuator is connected to the housing for driving, and a positioning structure is provided between the actuator and the housing. Under the guidance of the actuator's driving and positioning structure, the housing flips the rear view element installed along the set direction via the housing spherical shell surface around the actuator spherical shell surface. The rearview mirror comprising the above actuator spherical shell structure. The vehicle comprising the above rearview mirror. The present disclosure has the beneficial effects below: the positioning structure can guide the relative rotation between the actuator spherical shell surface and the housing spherical shell surface; compared with traditional spherical shell structures, it can effectively avoid shaking of the rear view element during angle adjustment, improving user comfort.

12 Claims, 8 Drawing Sheets

ACTUATOR SPHERICAL SHELL STRUCTURE, REARVIEW MIRROR AND VEHICLE

CROSS-REFERENCE TO RELATED APPLICATION

This application claims priority to Chinese Patent Application No. CN 202310840673.7, filed on Jul. 10, 2023, the entirety of which is incorporated herein by reference.

TECHNICAL FIELD

The present disclosure relates to the field of automotive technology, especially to an actuator spherical shell structure, rearview mirror and vehicle.

BACKGROUND

The rearview mirror presents different rear view when different drivers drive the vehicle. At this time, it is necessary to adjust the mirror surface of the rearview mirror to meet the driving needs of different drivers. There are two ways to adjust the mirror surface of the rearview mirror: front and rear folding and up and down adjustment.

At present, the internal and external folding performance is relatively good. There is a phenomenon of mirror shake and distortion in the adjustment process of up and down adjustment. Therefore, solving the problem of adjustment shake and distortion is an important link to improve the quality of the rearview mirror.

SUMMARY

One objective of the present disclosure is to provide a spherical shell structure that can avoid shaking of the mirror surface during the up and down adjustment process.

Another objective of the present disclosure is to provide a rearview mirror with mirror surface angle adjustment effect.

Another objective of the present disclosure is to provide a vehicle with good rearview mirror angle adjustment.

In order to achieve the above objective, the technical solution adopted by the present disclosure is as follows: an actuator spherical shell structure, including an actuator spherical shell surface located in the inner cavity of the housing and a housing spherical shell surface located outside of the actuator and rotating cooperatively with the actuator spherical shell surface; the actuator and the housing are drivably connected, and there is a positioning structure between the actuator and the housing. Under the driving force of the actuator and the guidance of the positioning structure, the housing rotates the rear view element installed in accordance with the set direction through the housing spherical shell surface by passing around the actuator spherical shell surface.

Preferably, the actuator is connected to the housing through the motor shaft at the output end; the positioning structure includes at least one pair of sliding fitting positioning surfaces; the positioning surfaces are respectively set on the housing and the actuator, and the positioning surfaces are parallel to the radial plane of the motor shaft.

Preferably, the actuator spherical shell surface is located below the interior of the housing, and the housing spherical shell surface is located on the lower exterior of the actuator.

Preferably, a detachable actuator spherical shell is installed inside the housing. The inner side of the actuator spherical shell is arc-shaped to form the actuator spherical shell surface.

Preferably, the actuator is detachably installed with a housing spherical shell at its lower part, and the outer surface of the housing spherical shell is arc-shaped to form the housing spherical shell surface.

Preferably, each pair of the two positioning surface is respectively set on the actuator spherical shell and the housing spherical shell.

Preferably, a damping structure is further provided between the actuator spherical shell surface and the housing spherical shell surface, which is adapted to continuously provide damping force for the relative rotation between the actuator spherical shell surface and the housing spherical shell surface.

Preferably, the inner middle of the actuator spherical shell is provided with a circular step groove; the damping structure comprises a damping ring made of elastic material, which is installed in the step groove so that when the actuator spherical shell is matched with the housing spherical shell, the damping ring is able to undergo elastic deformation under the compression of the housing spherical shell surface.

Preferably, the rear view element comprises a mirror and/or camera.

A rearview mirror, comprising the above-mentioned actuator spherical shell structure.

A vehicle, comprising the above rearview mirror.

Compared with the prior art, the present disclosure has the beneficial effects below:

(1) When the actuator drives the housing to rotate, the locating structure can guide the relative rotation between the actuator spherical shell surface and the housing spherical shell surface, ensuring that the housing can flip the installed rear view element in the set direction. Compared with the traditional spherical shell structure, it can effectively avoid rear view element shaking during angle adjustment, improving user comfort.

(2) A damping structure formed by a damping ring comprising elastic material is also installed between the actuator spherical shell surface and the housing spherical shell surface. Thus, when the actuator spherical shell surface and the housing spherical shell surface rotate relative to each other, the damping structure can increase the rotational friction between the actuator spherical shell surface and the housing spherical shell surface. Compared with traditional spherical shell structure, this can effectively avoid tremors that occur in the process of adjusting the angle of the rear view element and further improve user comfort.

In the drawings: base 110, first buckle 111, connecting post 112, positioning post 113, first through hole 1100, side cover 120, base frame 130, connecting hole 131, positioning hole 132, installing cavity 1300, actuator spherical shell 140, first buckle block 141, actuator spherical shell surface 142, first positioning surface 143, step groove 144, second through hole 1400, actuator 200, motor shaft 210, installing part 220, second latch block 230, rear view element 300, housing spherical shell 400, second buckle 410, housing spherical shell surface 420, second positioning surface 430, third through hole 440, damping ring 500.

DETAILED DESCRIPTION OF THE EMBODIMENTS

The present disclosure is further described below in combination with specific implementations. It should be noted that the various embodiments or technical features described below can be arbitrarily combined to form new embodiments without conflicts.

In the description of the present disclosure, it should be noted that for orientation terms, orientations or positional relationships indicated by the terms "center", "transverse", "longitudinal", "length" "width", "thickness", "upper", "lower", "front", "rear", "left", "right", "vertical", "horizontal", "top", "bottom", "inside", "outside", "clockwise", "anticlockwise", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms cannot construed as limiting the specific protection scope of the present disclosure.

It should be noted that the terms "first", "second", etc. in the specification and claims of the present disclosure are used to distinguish similar objects, and do not have to be used to describe a specific order or sequence.

One aspect of the present disclosure provides an actuator spherical shell structure, as shown in FIG. 1 to FIG. 15, wherein a preferred embodiment includes a actuator spherical shell surface 142 set in the inner cavity of the housing and a housing spherical shell surface 420 set on the outside of the actuator 200 and rotating in cooperation with the actuator spherical shell surface 142. The housing is equipped with a rear view element 300, so that the housing can drive the rear view element 300 to adjust the angle in different directions through flipping up and down and left and right. The actuator 200 can be driven by the output end to connect with the housing, and a positioning structure is also arranged between the actuator 200 and the housing. When the user needs to adjust the angle of the rear view element 300 up and down, the housing can be flipped together with the installed rear view element 300 by the driving of the actuator 200 through rotating around the housing spherical shell surface 420 with the actuator spherical shell surface 142. In the process of flipping the rear view element 300, the positioning structure can guide the relative rotation between the actuator spherical shell surface 142 and the housing spherical shell surface 420 to ensure that the housing can precisely flip the installed rear view element 300 along the set direction. Compared with the traditional spherical shell structure, it can effectively avoid the shaking of the rear view element 300 during the angle adjustment process to improve the comfort of use of the user.

Figure 8:
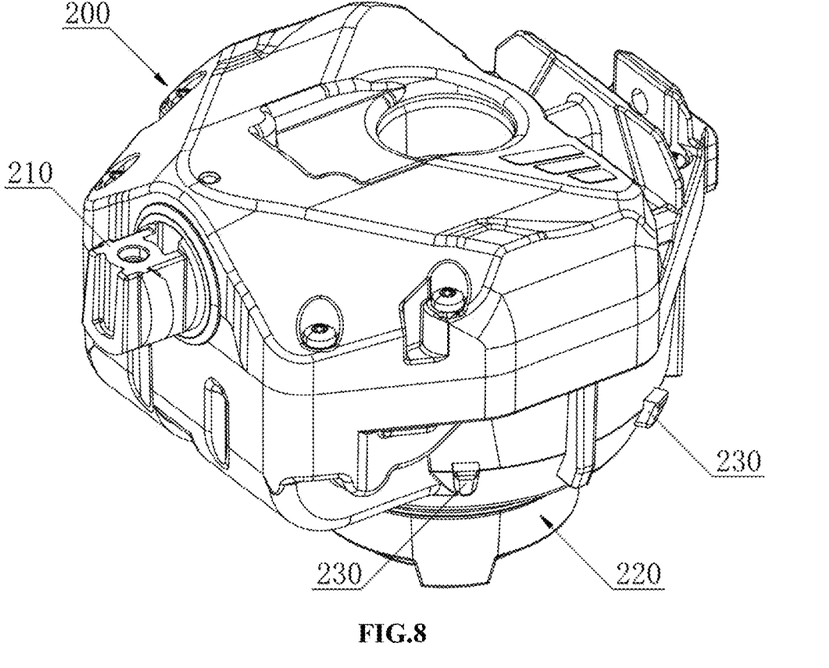
FIG. 8 is a schematic diagram of the structure of the actuator of the present disclosure.
Figure 9:
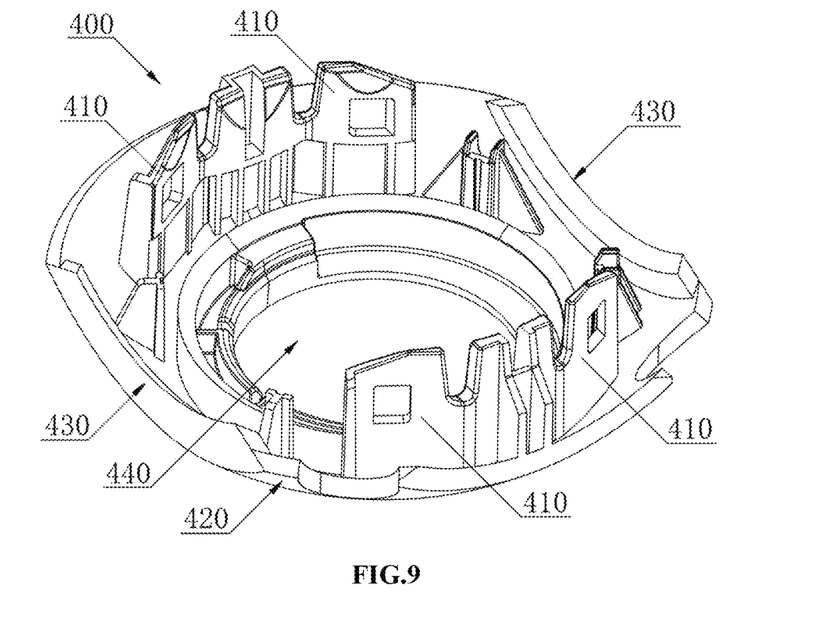
FIG. 9 is a schematic diagram of the housing spherical shell of the present disclosure in the axial lateral direction.
Figure 10:
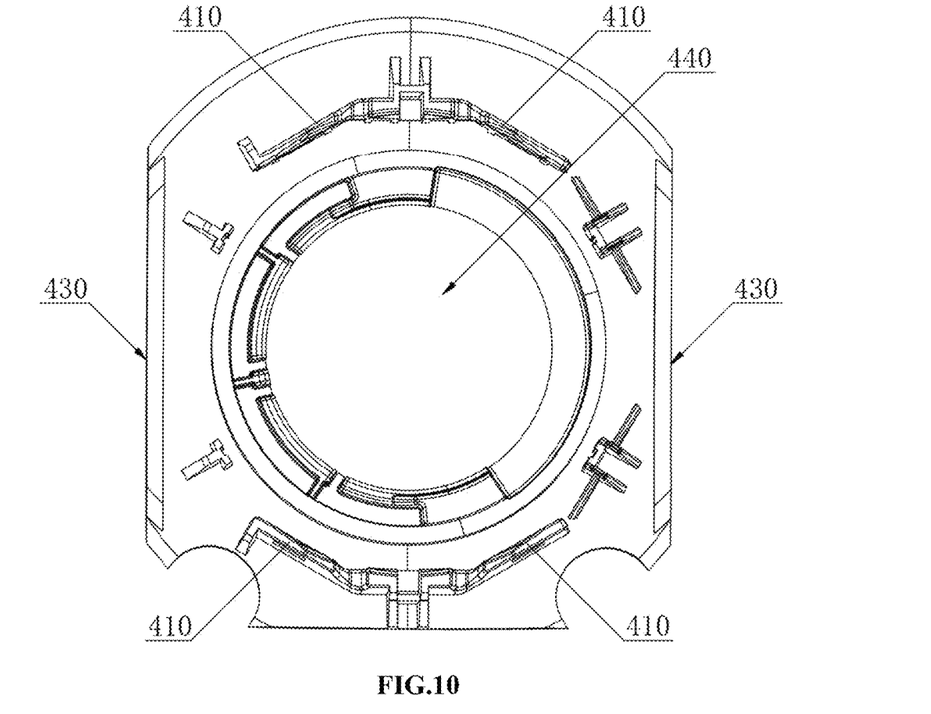
FIG. 10 is a schematic diagram of the housing spherical shell of the present disclosure in a top view direction.
Figure 11:
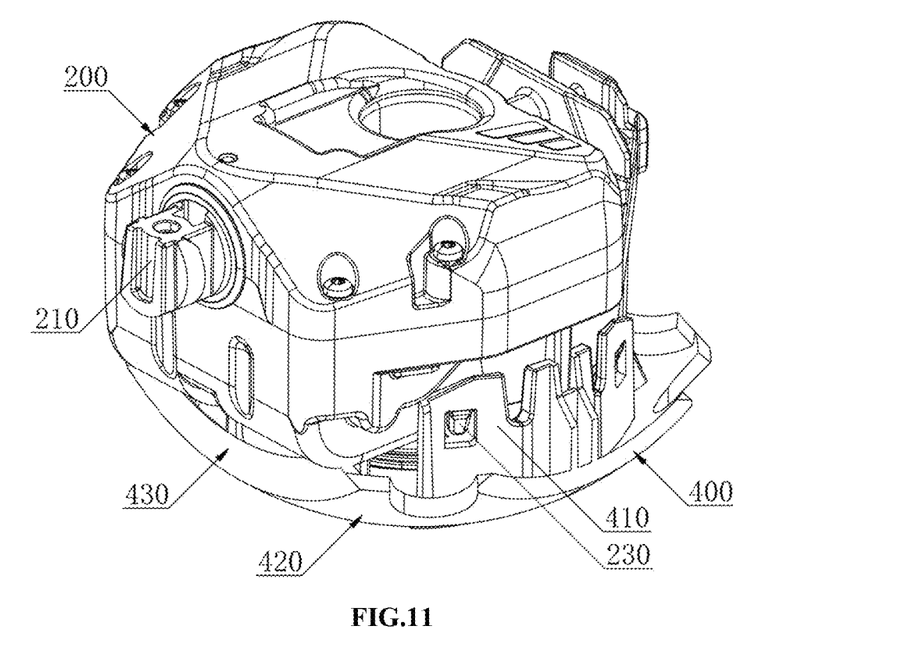
FIG. 11 is a schematic diagram of the structure of the housing spherical shell installed on the actuator of the present disclosure.

It should be noted that the rear view element 300 can be a mirror and/or camera, the rear view element 300 installed on the housing can be regarded as the mirror of the rearview mirror, and the actuator 200 is located inside the housing and connected to the vehicle through the installing part 220 as shown in FIG. 8, so the actuator 200 can be regarded as the mirror arm of the rearview mirror. Therefore, when adjusting the upper and lower angles of the mirror surface of the rearview mirror, the mirror arm remains stationary, and through the driving of the actuator 200, the mirror can be rotated up and down around the mirror arm for angle adjustment, thus achieving the mirror surface angle adjustment of the mirror through the angle change of the rear view element 300.

In order to reduce the noise and smoothness of the housing in adjusting the angle of the mirror surface, traditional rearview mirrors generally connect the housing with the actuator 200 through a spherical shell structure. That is, the inner part of the housing is designed with a actuator spherical shell surface 142, and the outer side of the actuator 200 is designed with a housing spherical shell surface 420, so that the housing can rotate and match with the housing spherical shell surface 420 of the actuator 200 through the actuator spherical shell surface 142. In traditional rearview mirror, the actuator spherical shell surface 142 and the housing spherical shell surface 420 are undirectional constraint structure, that is, the degree of freedom between the actuator spherical shell surface 142 and the housing spherical shell surface 420 is not fully constrained. Therefore, when the housing rotates around the housing spherical shell surface 420 through the actuator spherical shell surface 142, the housing may shake and distort, resulting in a poor user experience.

Therefore, in this embodiment, by setting a positioning structure between the housing and the actuator 200, the relative rotation between the actuator spherical shell surface 142 and the housing spherical shell surface 420 is guided through the positioning structure to ensure that the housing can rotate around the housing spherical shell surface 420 along the set direction through the actuator spherical shell surface 142.

In this embodiment, there are multiple ways to set the actuator spherical shell surface 142 and the housing spherical shell surface 420, including but not limited to the following three ways:

Setting Method 1: As shown in FIG. 5, FIG. 7, and FIG. 11 to FIG. 15, the actuator spherical shell surface 142 is set below the inside of the housing, and the housing spherical shell surface 420 is set below the outside of the actuator 200. When the actuator spherical shell surface 142 and the housing spherical shell surface 420 are matched, the housing spherical shell surface 420 is located above the actuator spherical shell surface 142 in the vertical direction.

Setting Method 2: The actuator spherical shell surface 142 is arranged above the interior of the housing, while the housing spherical shell surface 420 of the housing is set above the outside of the actuator 200. When the actuator spherical shell surface 142 and the housing spherical shell surface 420 are matched, the housing spherical shell surface 420 is located vertically below the actuator spherical shell surface 142.

Setting Method 3: The upper and lower parts inside the housing are both equipped with the actuator spherical shell surface 142, and the outer upper and lower parts of the actuator 200 are both equipped with the housing spherical shell surface 420. Therefore, when matching the actuator spherical shell surface 142 with the housing spherical shell surface 420, the actuator spherical shell surface 142 can vertically envelop the housing spherical shell surface 420 up and down.

It can be understood that the above three setting methods all meet the usage requirements. For the sake of convenience in describing, the following content will take the first setting method mentioned above as an example.

One of the embodiments of the present disclosure, as shown in FIG. 5 to FIG. 7 and FIG. 9 to FIG. 15, the removable lower portion of the housing is equipped with an actuator spherical shell 140, and the inner side of the upward-facing actuator spherical shell 140 is arc-shaped to form a actuator spherical shell surface 142. The removable lower portion of the actuator 200 is equipped with a housing spherical shell 400, and the outer side of the downward-facing housing spherical shell 400 is arc-shaped to form a housing spherical shell surface 420.

It can be understood that the actuator spherical shell surface 142 and the housing spherical shell surface 420 can also be directly formed on the housing and actuator 200. That is, when forming the housing, a curved concave surface can be formed below the inside of the housing, which is the actuator spherical shell surface 142. When forming the outer shell of the actuator 200, a shell with a lower curved surface can be formed, and the lower curved surface of the shell is the housing spherical shell surface 420.

However, forming the actuator spherical shell surface 142 and the housing spherical shell surface 420 directly on the housing and actuator 200 may increase the difficulty of forming the housing and actuator 200's outer shell, which in turn greatly increases the production cost of the housing and actuator 200. Moreover, the actuator 200 and the housing may be produced by two different manufacturers, which can easily lead to poor fitting accuracy of the actuator spherical shell surface 142 and the housing spherical shell surface 420.

In this embodiment, the difficulty in design and production can be effectively reduced by separately designing the actuator spherical shell 140 with the actuator spherical shell surface 142 and the housing spherical shell 400 with the housing spherical shell surface 420. At the same time, the actuator spherical shell 140 and the housing spherical shell 400 can be produced using the same process by the same manufacturer, thereby effectively improving the matching accuracy of the actuator spherical shell surface 142 and the housing spherical shell surface 420.

It should be noted that, as shown in FIG. 1 and FIG. 5 to FIG. 8, the housing comprises a base 110 and a side cover 120. The side cover 120 can be detachably connected to the side of the base 110 through buckling and other methods at the lower end. A installing port can be formed between the base 110 and the side cover 120 after they are connected. The rear view element 300 can be detachably installed in the installing port by buckling and other methods. Thus, the base 110, side cover 120 and rear view element 300 can form an internal cavity for placing the actuator 200.

In this embodiment, as shown in FIG. 1, FIG. 2, and FIG. 5 to FIG. 7, the actuator spherical shell 140 is fixedly installed on the base 110. Various methods can be used to fix the actuator spherical shell 140 and the base 110, including threaded connections, rigid links, and adhesive bonding.

For ease of understanding, the fixation of the actuator spherical shell 140 and the base 110 will be explained using the example of rigid links. Specifically, as shown in FIG. 2 to FIG. 7, there is at least one pair of first buckle 111 set upwards on the inner side of the base 110, and at least one pair of first buckle block 141 extending outwardly on the outside of the actuator spherical shell 140. During the installation of the actuator spherical shell 140, the first buckle block 141 of the actuator spherical shell 140 can be aligned with the first buckle 111 of the base 110, and then the first buckle block 141 on the actuator spherical shell 140 are snapped into the slots of the first buckle 111 on the base 110 by pressing.

Figure 2:
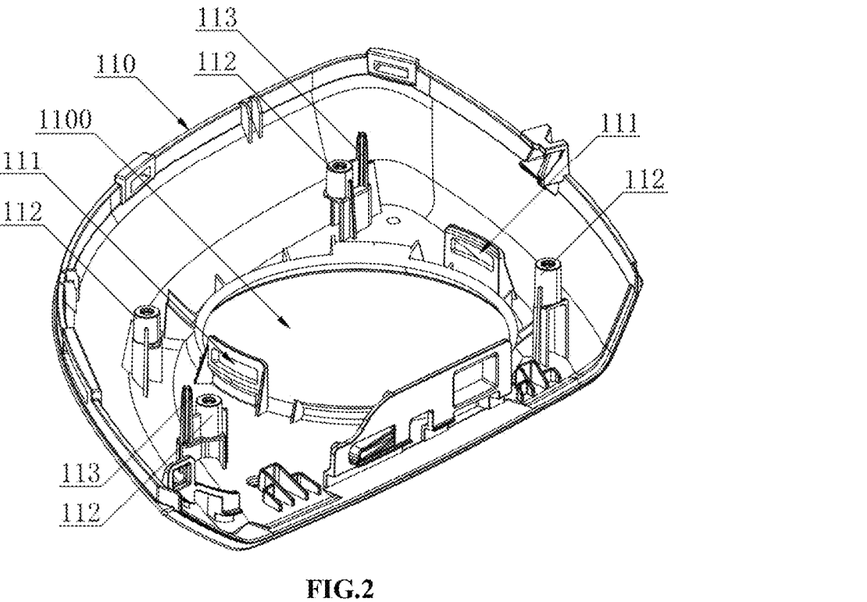
FIG. 2 is a schematic diagram of the structure of the base of the present disclosure.
Figure 3:
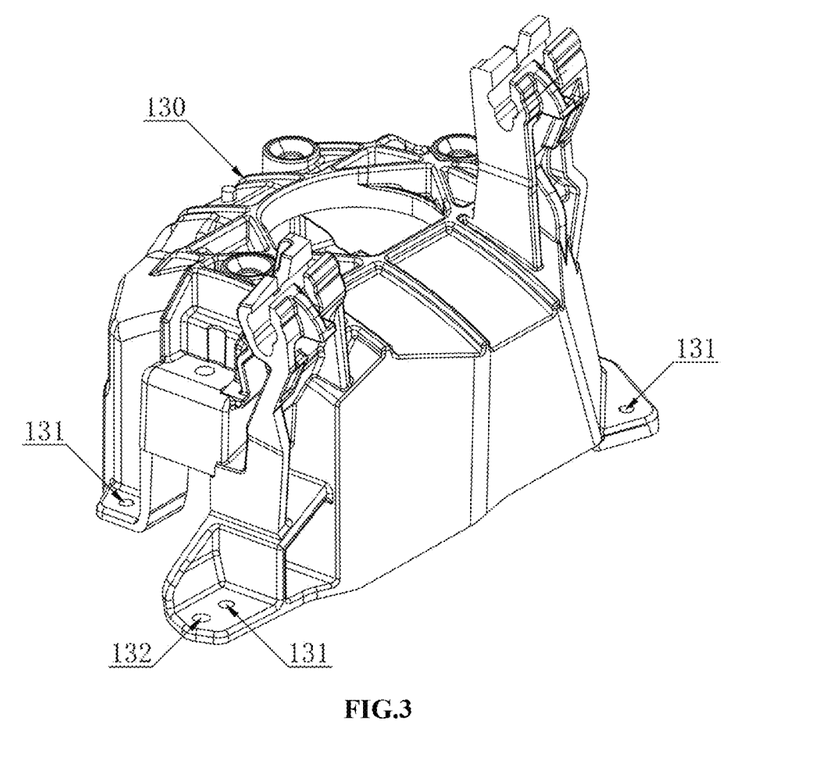
FIG. 3 is a schematic diagram of the external structure of the base frame of the present disclosure.
Figure 4:
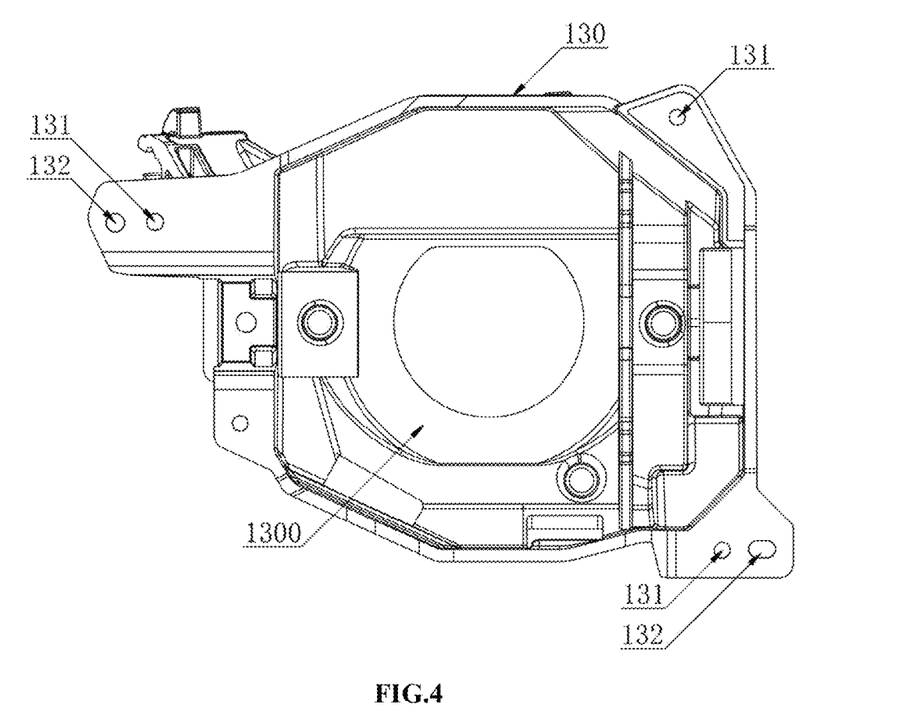
FIG. 4 is a schematic diagram of the internal structure of the base frame of the present disclosure.
Figure 5:
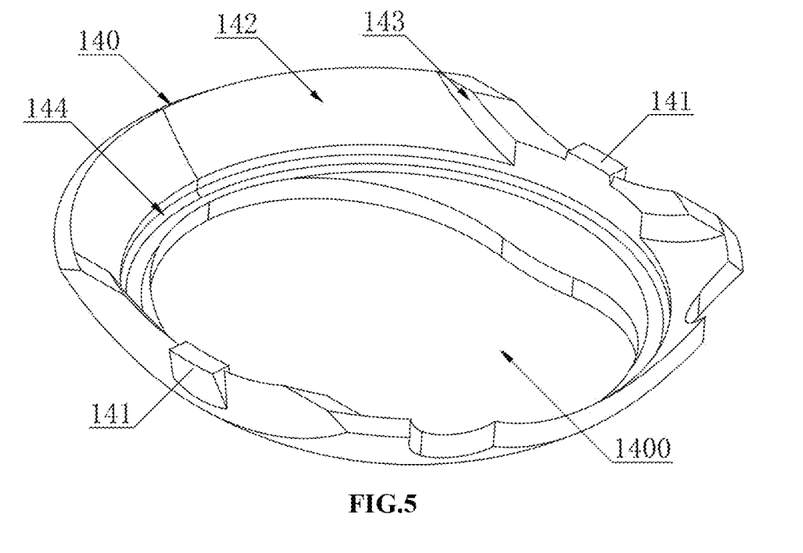
FIG. 5 is a schematic diagram of the structure of the actuator spherical shell in the axial direction of the present disclosure.
Figure 6:
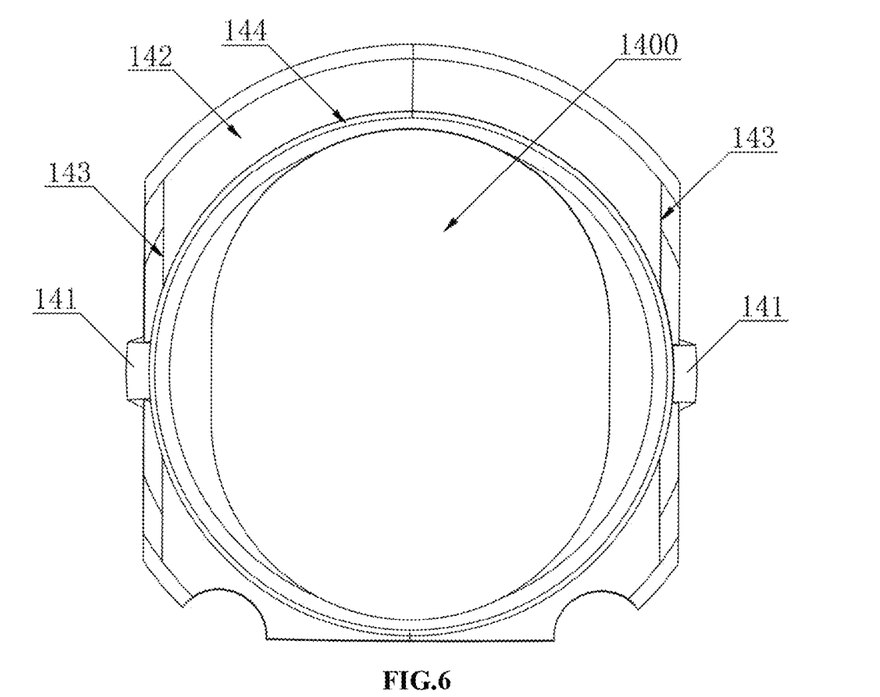
FIG. 6 is a schematic diagram of the structure of the actuator spherical shell of the present disclosure from a top view direction.
Figure 7:
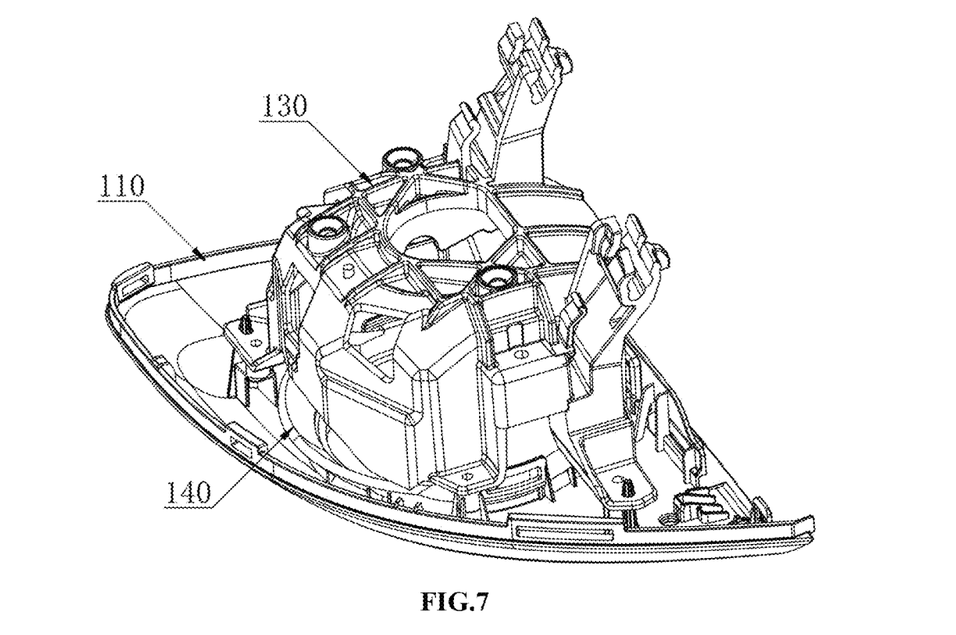
FIG. 7 is a schematic diagram of the installation structure of the actuator spherical shell and the base frame on the base of the present disclosure.

It can be understood that the first buckle 111 can also be set on the actuator spherical shell 140 and the first buckle block 141 can be set on the base 110. At the same time, in order to ensure the stability of the connection between the actuator spherical shell 140 and the base 110, at least one pair of first buckle block 141 and first buckle 111 need to be connected by rigid links; for example, as shown in FIG. 2, FIG. 5, and FIG. 6, the number of first buckle block 141 and first buckle 111 is exactly one pair, and the two first buckle block 141 and the two first buckle 111 are symmetrically arranged to ensure that the force between the two first buckle block 141 and the two first buckle 111 is evenly distributed and stable.

In this embodiment, as shown in FIG. 8 to FIG. 11, the housing spherical shell 400 is fixedly installed on the lower outer side of the actuator 200. There are multiple ways to fix the housing spherical shell 400 and the actuator 200, commonly including threaded connections, rigid links, and adhesive bonding.

For ease of understanding, the fixation of the housing spherical shell 400 and the actuator 200 is explained taking the rigid links as an example. Specifically, as shown in FIG. 8 to FIG. 11, there is at least one pair of second buckle 410 arranged upwardly on the inner side of the housing spherical shell 400, and there is at least one pair of second buckle block 230 extending downwardly on the outer side of the actuator 200. When installing the housing spherical shell 400, the second buckle 410 on the housing spherical shell 400 can be aligned with the second buckle block 230 on the outer side of the actuator 200, and then the second buckle block 230 on the outer side of the actuator 200 can be snap-engaged with the slots on the second buckle 410 through pressing.

It can be understood that the second buckle 410 can also be set on the outside bottom of the actuator 200, and the second buckle block 230 can be set on the inside of the housing spherical shell 400. At the same time, in order to ensure the stability of the connection between the housing spherical shell 400 and the actuator 200, at least one pair of second buckle block 230 and one pair of second buckle 410 are rigid links. For example, as shown in FIG. 8 to FIG. 11, since the cross-section of the actuator 200 in the vertical direction is square, four second buckle block 230 can be used, which can be devided into two pairs, and two pairs of second buckle block 230 are symmetrically set on the opposite sides of the actuator 200; The position of the second buckle 410 set on the housing spherical shell 400 corresponds to the second buckle block 230.

In this embodiment, as shown in FIG. 1, FIG. 3, FIG. 4, and FIG. 7, the upper part of the inner cavity of the housing is detachably installed with the base frame 130. The base frame 130 can cooperate with the actuator spherical shell surface 142 of the actuator spherical shell 140 through the internal installing cavity 1300, thereby forming a placement cavity for rotationally placing the actuator 200. The actuator 200 can be located in the placement cavity together with the installed housing spherical shell 400, so that the lower part of the actuator 200 can be rotatably matched with the actuator spherical shell 140 through the housing spherical shell 400, and the upper part of the actuator 200 can be rotated together with the installing cavity 1300 of the base frame 130. At the same time, the motor shaft 210 of the output end of the actuator 200 can be connected to the base frame 130. After the actuator 200 is started, the actuator 200 can drive the housing to rotate around the axis of the motor shaft 210 (the axis X in FIG. 12 and FIG. 14) through the rotation of the motor shaft 210, and the direction of rotation is as indicated by the dashed arrow in FIG. 12 and FIG. 14.

It can be understood that in order to reduce the weight of the housing and facilitate the molding and processing of side cover 120, the side cover 120 is generally a simple single-layer thin plastic structure. The structure of the actuator 200 is generally more complex, and in order to ensure the stable rotation of the housing, the interior of the housing needs to be rotated and matched with the actuator 200 at least above and below in the vertical direction, and the lower part of the housing can be rotated and matched through the actuator spherical shell 140 and the housing spherical shell 400 installed with the actuator 200. If the upper part of the housing directly matches the rotating structure of the actuator 200 through molding, the structure of the side cover 120 will be complicated, which will increase the production efficiency and production cost of the side cover 120.

In this embodiment, the design difficulty of the housing can be effectively reduced by separately designing a base frame 130 for rotating and adapting to the upper structure of actuator 200, and then fixing the base frame 130 to the inside of the housing from above.

In this embodiment, as shown in FIG. 2, FIG. 3, FIG. 4, and FIG. 7, there are multiple connecting hole 131 on the side of the base frame 130, and multiple connecting post 112 are set on the inner side of the base 110. When installing the base frame 130, the multiple connecting hole 131 can be aligned with the corresponding connecting post 112, and then threaded connections with fasteners such as screws that pass through the connecting hole 131 and the threaded hole on the connecting post 112.

It can be understood that, since the base frame 130 is used for connecting with the output end of the actuator 200, the firmness of the connection between the base frame 130 and the housing is required to be high, so threaded connection is chosen.

It can also be understood that since the base frame 130 is directly connected to the output end of the actuator 200, the installation accuracy of the base frame 130 and the base 110 will directly affect the accuracy of the actuator 200 in driving the housing to adjust the angle of the rear view element 300. Since the accuracy of the threaded connection is generally limited, it is necessary to set a limiting structure between the base frame 130 and the base 110 to ensure that the installation accuracy of the base frame 130 meets the requirements of use.

Specifically, as shown in FIG. 2, FIG. 3, FIG. 4, and FIG. 7, the limiting structure comprises at least one pair of positioning post 113 set on the base 110, and at least one pair of positioning hole 132 set on the side of the base frame 130. When installing the base frame 130 and the base 110, the positioning hole 132 of the base frame 130 can be aligned inserted into the corresponding positioning post 113 on the base 110, and then adopted threaded connection the base frame 130 and the base 110 with screws.

It can be understood that, as shown in FIG. 2, FIG. 3, FIG. 4, and FIG. 7, the optimal number of positioning post 113 and positioning hole 132 is one pair, and the two positioning hole 132 are set diagonally along the base frame 130 to further improve the installation accuracy between the base frame 130 and the base 110.

In this embodiment, as shown in FIG. 2, FIG. 4 to FIG. 6, and FIG. 9 to FIG. 11, a first through hole 1100 is provided in the center of the base 110, a second through hole 1400 is provided in the center of the actuator spherical shell 140, and a third through hole 440 is provided in the center of the housing spherical shell 400. When assembling the housing and the actuator 200, the first through hole 1100, the second through hole 1400, and the third through hole 440 are aligned and connected to each other so that the installing part 220 of the actuator 200 can pass through the third through hole 440, the second through hole 1400, and the first through hole 1100 in turn and be connected to the vehicle body. Furthermore, the dimensions of the first through hole 1100, the second through hole 1400, and the third through hole 440 along the direction of rotation adjustment of the rear view element 300 are larger than the dimensions of the installing part 220 of the actuator 200, in order to avoid interference between the housing and the installing part 220 of the actuator 200 during the rotation process of the housing together with the rear view element 300 driven by the actuator 200.

For convenience of understanding, a detailed description of the assembly process of the housing and actuator 200 can be provided below.

(1) First, the housing spherical shell 400 passes through the installing part 220 of the actuator 200 through the third through hole 440 and is installed on the lower part of the actuator 200, through the second buckle block 230 and the second buckle 410 by rigid links. Thereby achieving the assembly of the actuator 200 and the housing spherical shell 400.

(2) Then, the actuator spherical shell 140 is installed on the inside of the base 110 through the first buckle block 141 and the first buckle 111 by rigid links, and the second through hole 1400 of the actuator spherical shell 140 is aligned with the first through hole 1100 of the base 110, to achieve the assembly of the actuator spherical shell 140 and the base 110.

(3) Then, the assembled actuator 200 is placed on the actuator spherical shell 140 through the housing spherical shell 400. The installing part 220 of the actuator 200 can pass through the second through hole 1400 and the first through hole 1100.

(4) Then, the base frame 130 is covered on top of the actuator 200 and is threadedly connected to the base 110 using screws, so that at this time the actuator 200 is securely placed between the base frame 130 and the actuator spherical shell 140.

Then, the side cover 120 is installed on the side of the base 110. Finally, the rear view element 300 is installed in the mounting port formed between the side cover 120 and the base 110. In order to further improve the installation stability of the rear view element 300, the back of the rear view element 300 can be cooperatively connected to the base frame 130 through a buckle structure.

In one embodiment of the present disclosure, as shown in FIG. 8, the actuator 200 is connected to the housing through the motor shaft 210 of the output end. The positioning structure includes at least one pair of sliding-matching positioning surface, which are respectively located on the housing and actuator 200, and the positioning surface are parallel to the radial plane of the motor shaft 210.

Figure 12:
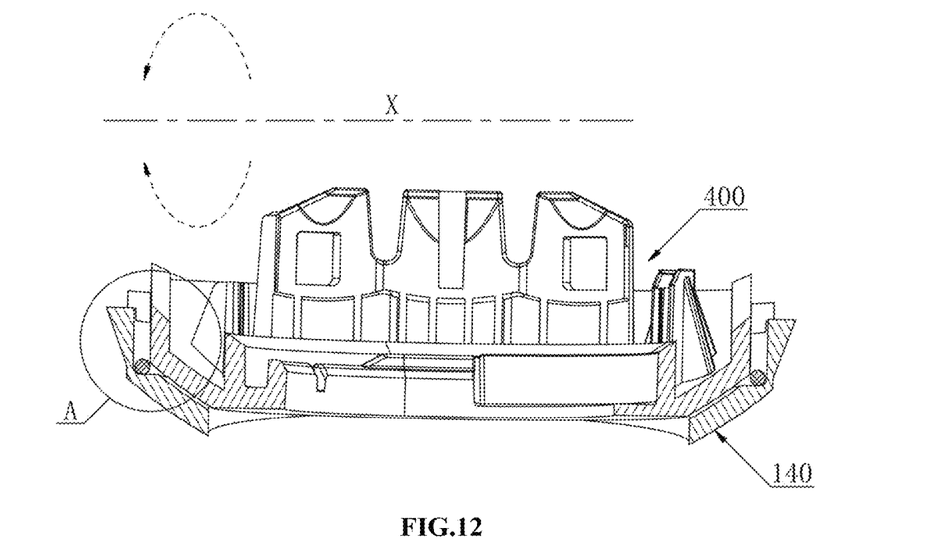
FIG. 12 is a sectional schematic diagram of the mating structure of the actuator spherical shell and the housing spherical shell of the present disclosure.
Figure 13:
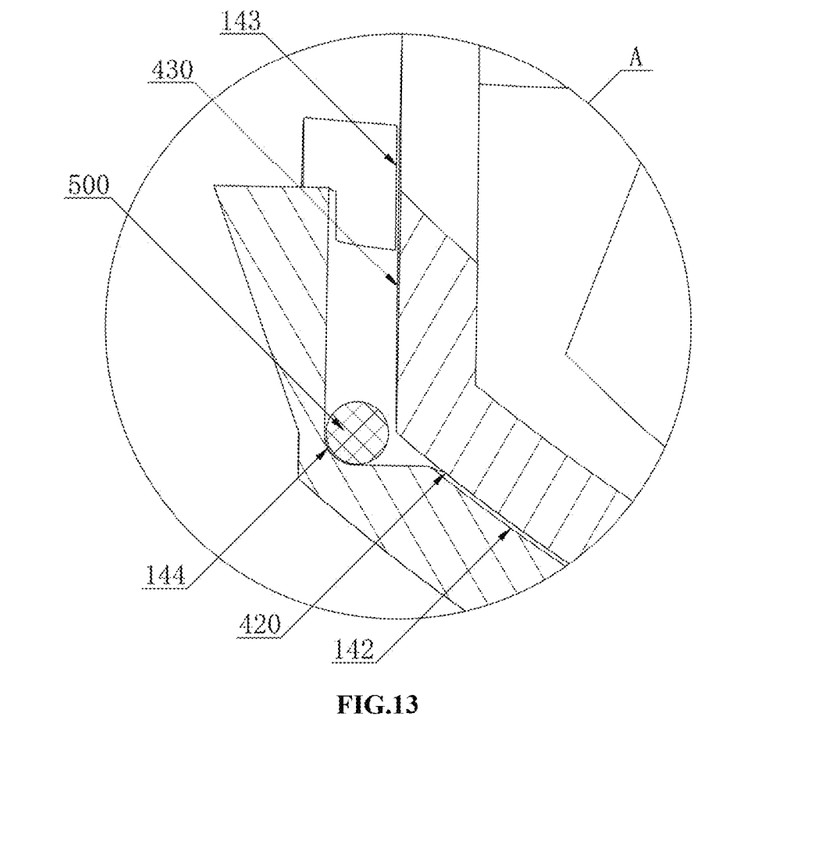
FIG. 13 is an enlarged schematic diagram of a partial view A in FIG. 12 of the present disclosure.
Figure 14:
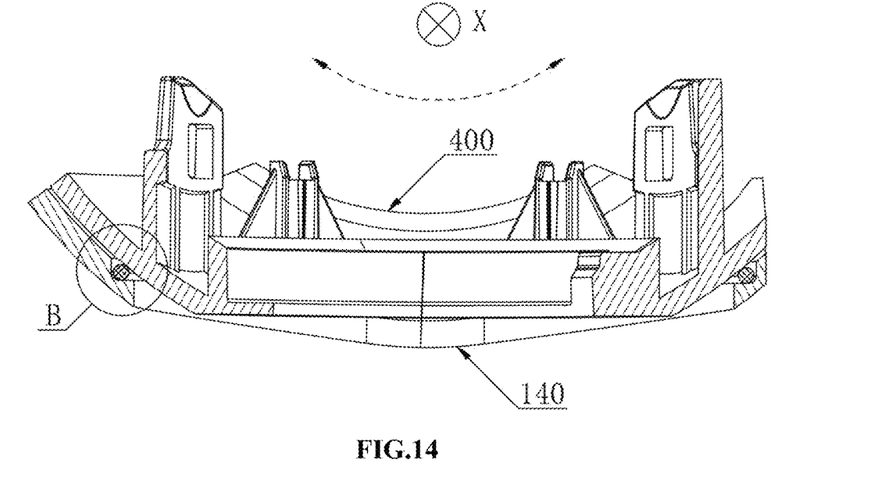
FIG. 14 is the other sectional schematic diagram of the matching structure of the actuator spherical shell and the housing spherical shell of the present disclosure.
Figure 15:
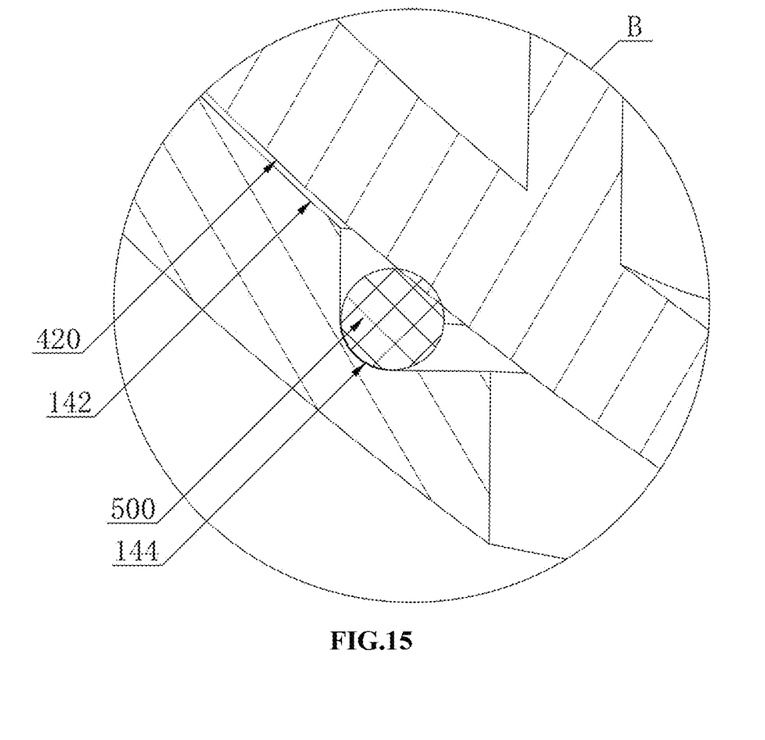
FIG. 15 is an enlarged schematic diagram of a partial view B in FIG. 14 of the present disclosure.

It can be understood that, because the traditional rearview mirror's spherical shell structure is a undirectional constraint structure, after the long-term wear and tear between the motor shaft 210 at the output end of the actuator 200 and the housing, the housing will shake the rear view element 300 in a non-set direction. Therefore, the design of the positioning structure in this embodiment is to guide the rotation of the housing along the set direction. Generally speaking, the set direction of the housing driving the rear view element 300 to rotate is the rotational direction of the motor shaft 210 at the output end of the actuator 200, i.e. the radial plane direction parallel to the motor shaft 210 at the output end of the actuator 200. Among them, the axis X in FIG. 12 and FIG. 14 represents the axis of the motor shaft 210 at the output end of the actuator 200, and the direction indicated by the dashed arrow is the rotational direction of the housing driven by the actuator 200.

It can also be understood that the positioning surface includes a first positioning surface 143 provided on the housing and a second positioning surface 430 provided on the actuator 200. The first positioning surface 143 and the second positioning surface 430 are mutually slidably matched and correspond in number. Therefore, the number of positioning surface included in the positioning structure is at least one pair, and the specific number can be selected by those skilled in the art according to actual needs. As shown in FIG. 5, FIG. 6, FIG. 8, and FIG. 9, in order to improve the stability of the positioning structure, the number of the first positioning surface 143 and the second positioning surface 430 is both two, and they are symmetrically set between the two first positioning surface 143 and between the two second positioning surface 430.

In this embodiment, there are multiple ways to set the first positioning surface 143 and the second positioning surface 430, including but not limited to the following two ways.

Setting method 1: First positioning surface 143 is set on the inside of the base frame 130, and second positioning surface 430 is set on the upper outer side of the actuator 200.

Setting Method 2: As shown in FIG. 5, FIG. 6, FIG. 8, and FIG. 9, the first positioning surface 143 is set on the side of the actuator spherical shell 140, and the second positioning surface 430 is set on the side of the housing spherical shell 400.

It can be understood that due to the low molding accuracy of the housing of the actuator 200, directly forming the second positioning surface 430 through the molding of the housing of the actuator 200 will result in poor cooperative accuracy between the first positioning surface 143 and the second positioning surface 430. Therefore, in the present disclosure, the setting method for the first positioning surface 413 and the second positioning surface 430 is preferably the second setting method described above. In addition, the first positioning surface 143 located in the actuator spherical shell 140 and the second positioning surface 143 located in the housing spherical shell 400 can be directly obtained through the molding of the actuator spherical shell 140 and the housing spherical shell 400, or can be obtained through subsequent cutting processing.

It should be noted that in order to ensure smooth rotation of the housing under the driving of the actuator 200, the cooperating damping between the housing and the actuator 200 is limited. Moreover, with the long-term relative rotation of the actuator spherical shell surface 142 and the housing spherical shell surface 420, the cooperating damping between the housing and the actuator 200 will gradually decrease. It will cause during the housing to drive the rear view element 300 to flip up and down under the drive of the actuator 200, the housing to drive the rear view element 300 will cause tremors along the flipping plane relative to the actuator 200, thus affecting the user's experience. Therefore, in one embodiment of the present disclosure, a damping structure is provided between the actuator spherical shell surface 142 and the housing spherical shell surface 420, which can continuously provide damping for the relative rotation of the actuator spherical shell surface 142 and the housing spherical shell surface 420, so as to ensure that the housing remains stable and free of tremors during the angle adjustment of the rear view element 300.

In this embodiment, as shown in FIG. 1 and FIG. 12 to FIG. 15, a circular step groove 144 is provided in the inner middle part of the actuator spherical shell 140. The damping structure includes a damping ring 500 made of elastic material, which is installed inside the step groove 144 so that when the actuator spherical shell 140 is matched with the housing spherical shell 400, the damping ring 500 can undergo elastic deformation under the compression of the housing spherical shell surface 420. The elastic deformation of the damping ring 500 provides damping force for the relative rotation between the actuator spherical shell surface 142 and the housing spherical shell surface 420. Since the damping ring 500 is made of elastic material, the damping ring 500 continues to exist to ensure that the damping force applied by the damping ring 500 to the actuator spherical shell surface 142 and the housing spherical shell surface 420 continues to exist.

Specifically, as shown in FIG. 5, the actuator spherical shell surface 142 of the actuator spherical shell 140 and the second through hole 1400 at the center are transitioned through the step groove 144, and the maximum size of the second through hole 1400 is slightly smaller than the circumferential diameter of the step groove 144, to ensure that the damping ring 500 can be stably installed in the step groove 144.

It should be understood that the specific material of the damping ring 500 is well-known to those skilled in the art, and common elastic materials such as rubber are used. While ensuring sufficient elastic deformation force of the damping ring 500, it can also reduce the wear of the damping ring 500.

Figure 1:
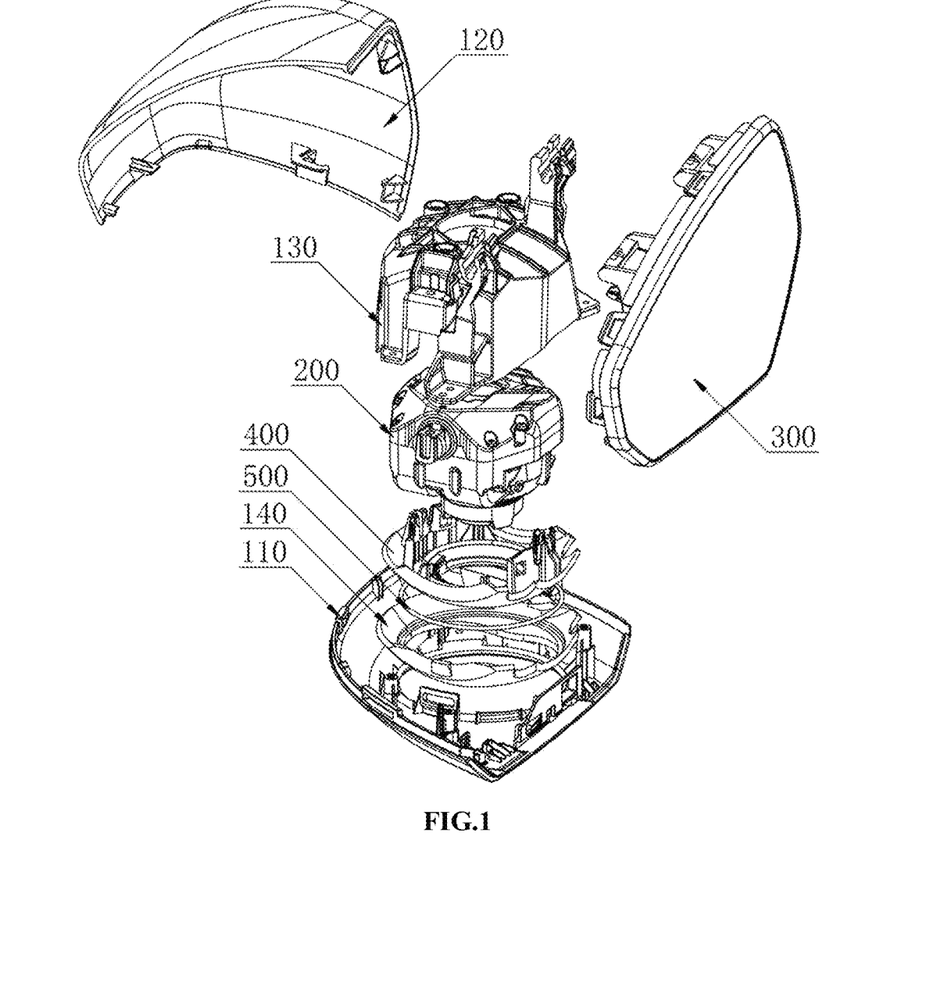
FIG. 1 is a schematic diagram of the dismantling state of the rearview mirror of the present disclosure.

Another aspect of the present disclosure provides a rear-view mirror, as shown in FIG. 1, wherein a preferred embodiment includes an actuator 200 and an housing, and the actuator 200 and the housing can be matched using the above actuator spherical shell structure.

Another aspect of the present disclosure provides a vehicle, wherein a preferred embodiment includes the above rearview mirror.

The above describes the basic principle, main characteristics and advantages of the present disclosure. Those skilled in the art should understand that the present disclosure is not limited by the foregoing embodiments. The foregoing embodiments and the description in the specification only illustrate the principles of the present disclosure. The present disclosure may have various changes and improvements without departing from the spirit and scope of the present disclosure, and these changes and improvements all fall within the claimed scope of the present disclosure. The claimed scope of the present disclosure is defined by the appended claims and their equivalents.

What is claimed is:

1. An actuator spherical shell structure, comprising
an actuator spherical shell surface set in an inner cavity of a housing;
a housing spherical shell surface set on an outside of an actuator, wherein the housing spherical shell surface rotates in cooperation with the actuator spherical shell surface;
a positioning structure formed by at least one pair of positioning surfaces, wherein the positioning structure is set between the actuator and the housing, so that when the housing is driven by the actuator and rotates around the housing spherical shell surface by the actuator spherical shell surface to drive an installed rear-view element, the positioning structure is configured to force the housing to flip in a set direction.

2. The actuator spherical shell structure according to claim 1, wherein the actuator is connected to the housing through a motor shaft of an output end.

3. The actuator spherical shell structure according to claim 1, wherein the positioning structure comprises at least two pairs of symmetrically arranged positioning surfaces, and wherein the positioning surfaces are parallel to a radial plane of the motor shaft.

4. The actuator spherical shell structure according to claim 3, wherein the two positioning surfaces of each pair are respectively provided on the actuator spherical shell and the housing spherical shell.

5. The actuator spherical shell structure according to claim 1, wherein the actuator spherical shell surface is set below an inside of the housing, and the housing spherical shell surface is set below an outside of the actuator.

6. The actuator spherical shell according to claim 1, wherein a detachable actuator spherical shell is installed below an inside of the housing, and an inner surface of the actuator spherical shell is arc-shaped to form the actuator spherical shell surface.

7. The actuator spherical shell structure according to claim 6, wherein
a lower part of the actuator is detachably installed with the housing spherical shell, and
an outer surface of the housing spherical shell is arc-shaped to form the housing spherical shell surface.

8. The actuator spherical shell structure according to claim 1, further comprising:
a damping structure between the actuator spherical shell surface and the housing spherical shell surface, which is configured for continuously providing damping force for the relative rotation of the actuator spherical shell surface and the housing spherical shell surface.

9. The actuator spherical shell structure according to claim 8, wherein
an inner middle part of the actuator spherical shell is provided with a circular step groove,
the damping structure comprises a damping ring made of elastic material, and
the damping ring is installed in the step groove so that when the actuator spherical shell and the housing spherical shell are matched, the damping ring is configured for elastic deformation under the compression of the housing spherical shell surface.

10. A rear-view mirror comprising an actuator spherical shell structure according to claim 1.

11. The rear-view mirror according to claim 10, wherein the rear-view element comprises a mirror and/or camera.

12. A vehicle comprising at least one rear-view mirror according to claim 10.

* * * * *